United States Patent [19]

Nemura et al.

[11] Patent Number: 5,149,049
[45] Date of Patent: Sep. 22, 1992

[54] SUPPORT DEVICE FOR MOTOR

[75] Inventors: Masaharu Nemura; Tomohiro Aoki, both of Kanagawa; Tohru Kobayashi, Tokyo; Masatoshi Ikkatai, Kanagawa; Yasushi Murayama, Tokyo; Takashi Uchida; Tatsuo Mitomi, both of Kanagawa, all of Japan

[73] Assignee: Canon Kabushiki Kaisha, Tokyo, Japan

[21] Appl. No.: 550,672

[22] Filed: Jul. 10, 1990

[30] Foreign Application Priority Data

Jul. 19, 1989 [JP] Japan ................................. 1-188231

[51] Int. Cl.$^5$ ............................................... F16M 9/00
[52] U.S. Cl. ...................................... 248/674; 248/638; 198/832
[58] Field of Search .............. 248/638, 632, 634, 674; 198/832, 804, 860.1

[56] References Cited

U.S. PATENT DOCUMENTS

| | | | |
|---|---|---|---|
| 3,385,541 | 5/1968 | Stelwagen | 248/638 X |
| 4,629,178 | 12/1986 | Waddell et al. | 198/644 X |
| 4,805,868 | 2/1989 | Claude | 248/638 X |
| 4,887,101 | 12/1989 | Hirose et al. | 346/134 |

Primary Examiner—Alvin C. Chin-Shue
Assistant Examiner—Korie H. Chan
Attorney, Agent, or Firm—Fitzpatrick, Cella, Harper & Scinto

[57] ABSTRACT

In a support device for a direct drive electric motor found in apparatuses such as copy machines, printers, etc., employing the method of driving a driven shaft by an output shaft of the motor in direct connection thereto, the motor body is supported by the direct connection of the output shaft of the motor with the driven shaft, and a rotation preventing plate is provided for preventing the motor body from rotating about its output shaft, as the rotation preventing plate is in engagement with a fixed member.

7 Claims, 3 Drawing Sheets

SUPPORT DEVICE FOR MOTOR

BACKGROUND OF THE INVENTION

1. Field of the Invention

This invention relates to a support device for a motor in which it is possible to improve the accuracy of rotation of the motor used in the image forming apparatus such as a copying machine, printer, etc.

2. Description of the Related Art

In the image forming apparatus, printer, etc., a paper or resin sheet is conveyed by a transport belt to the image forming station where an image is formed on the transported paper or resin sheet. If this transportation is not stable, deformation of the shape, an unevenness of density, etc. in the image are caused to occur, extremely deteriorating the quality of the image. Over the years, therefore, stabilizing the transportation has been a necessary and indispensable subject.

To this purpose, it is first necessary to enhance the accuracy of rotational movement provided by the motor.

So, as far as the machine that necessitates a highly accurate rotation is concerned, it has been common practice in the art that an output shaft of the motor and a driven shaft of the machine are connected directly to each other without any intermediary such as a gear train or endless belt, that is, the direct drive type of motor (hereinafter called the "DD" motor) is employed, which is free from the deterioration of the accuracy of rotation owing to the gear train or endless belt. In the case of using the DD motor, however, the eccentricity in the connection between the output shaft of the motor and the driven shaft of the machine which would have no influence when the driving torque transmission is in the form of the gear train or endless belt has a very large influence on the accuracy of rotation. At the same time, the presence of this eccentricity becomes a cause of deforming the motor and its carrier.

For this reason, in the prior art, to eliminate the above-described drawback, a method has been employed that when installing the motor on the machine, a rubber material or the like is sandwiched between the motor and the machine so that the eccentricity of the shafts is absorbed by the deformation of the rubber material.

With the DD motor now generally used, however, the eccentricities in its output shaft cannot be avoided. So, in many cases, even if it is mounted on the machine through the rubber material or the like, the bad influence of the eccentricity cannot be sufficiently removed.

SUMMARY OF THE INVENTION

An object of the invention is to eliminate the above-described drawback and to provide a support device for the motor which enables the influence of the eccentricity in the connection between the output shaft of the motor and the driven shaft of the machine to be removed for good stability of rotation.

Other objects of the invention will become apparent from the following description of embodiments thereof.

DETAILED DESCRIPTION OF THE PREFERRED EMBODIMENT

The present invention is next described in connection with an embodiment thereof by reference to the drawings.

Figure 1:
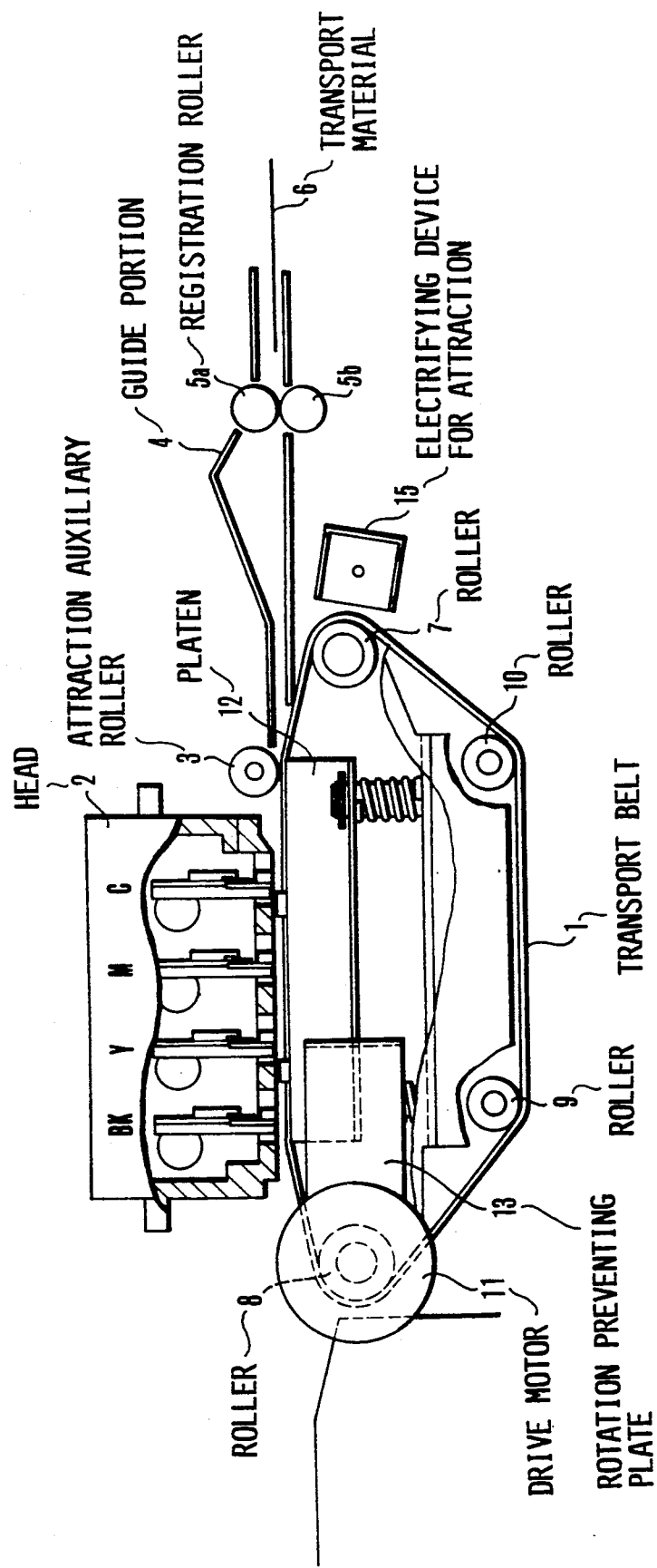
FIG. 1 is a view of the construction and arrangement of an embodiment of a support device for motor according to the invention as used in the transport system of an image forming apparatus.

FIG. 1 shows a transport system of the image forming apparatus. The illustrated example of the image forming apparatus is an ink jet printer. A head 2 having ink jet nozzles is arranged opposite to a transport belt 1 in the transport system. The transport system, roughly speaking, comprises the transport belt 1, an attraction auxiliary roller 3 arranged on the upper end of a stream portion of the transport belt 1 as viewed in the transporting direction, and a pair of registration rollers 5a and 5b arranged further upward therefrom through a guide portion 4.

With this, a paper sheet or like transport material 6 supplied by a paper feeder (not shown) arranged further upward from the transport system as viewed in the running direction (the right side as viewed in the figure), is sent out by the registration rollers 5a and 5b at predetermined timing to the transport belt 1. An image is formed by the ink jet head 2 on the transport material 6 carried on the transport belt 1.

Figure 2:
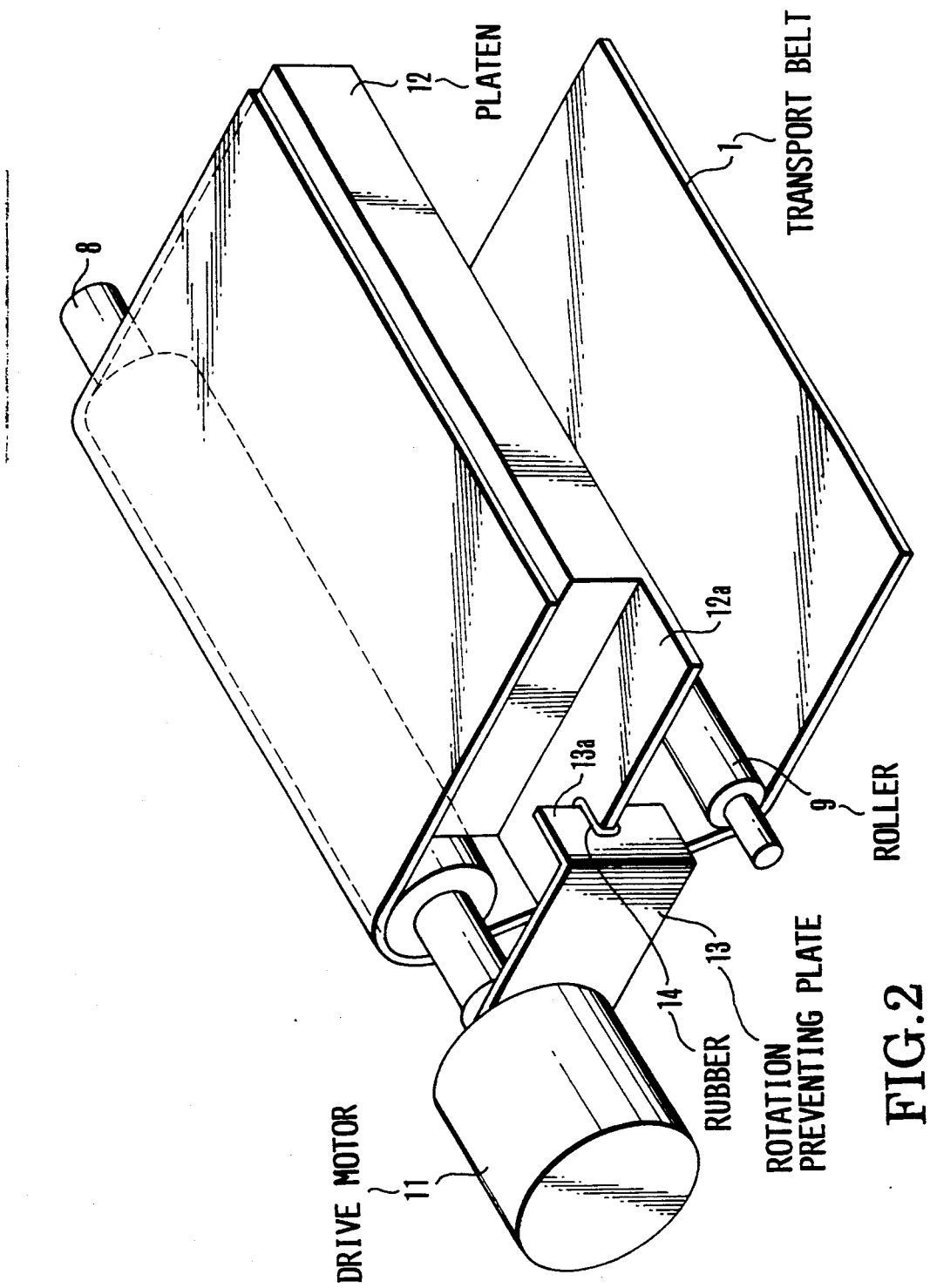
FIG. 2 is a perspective view of the details of the main parts of FIG. 1.

The transport belt 1 is in the endless form, and is put around four rollers 7, 8, 9 and 10 arranged in the respective corners of a trapezoid whose upper side is longer than the lower side to be driven to rotate by a drive motor 11, its upper surface being a transport surface. That portion of the transport belt 1 which confronts the ink jet head 2 is backed up by a platen 12 in order to insure the flatness of the transport belt 1 in the image forming station. The drive motor 11 is connected directly to the driven roller 8 without any intermediary such as a gear train or an endless belt, thus assuring removal of the bad influence the gear train or belt would otherwise have on the accuracy of rotation. This connection between the output shaft of the motor 11 and the driven roller 8 is carried out in such a way that the end portion of the driven roller 8 is machined to a taper shape and it is then inserted under pressure into a core hole bored in the output shaft of the motor 11, so that there is no eccentricity or backlash between the output shaft of the motor 11 and the driven roller 8. Alternatively, the end portion of the driven roller 8 is threaded, and connected directly with the threaded portion of the output shaft of the motor 11. In other words, the connection between the output shaft of the motor 11 and the driven roller 8 must be made to have a minimum backlash and eccentricity. Also, the drive motor 11 is not mounted to the body of the machine by screw fasteners, but is supported only by the connection with the driven roller 8 as shown in FIG. 2 so that the eccentricity of the output shaft of the motor 11 does not have a bad influence on the accuracy of rotation of the roller 8, or an unduly large stress is not laid on the motor 11 and its carrier by the eccentricity. Further, a rotation preventing plate 13 is mounted on the motor 11. Its bent end portion 13a is provided with a cutout which is fitted on an extension 12a of the platen 12 to prevent the motor 11 body as the motor casing from rotating. The rotation preventing plate 13 and the platen 12 come into contact with each other in only the thickness of the rotation preventing plate 13 so that the motor 11 body is not hindered from wiggling due to the eccentricity of the motor shaft. Here, a rubber 14 for vibration proofing is fitted in the cutout of the rotation preventing plate 13 to prevent vibrations in the contacting portion with the platen 12.

Meanwhile, below the path of feed of the transport material 6, there is arranged an electrifying device 15 for attraction in the vicinity of the transport belt 1 to electrify the upper surface of the transport belt 1. The transport belt 1 is made of resin material such as polyurethane, or rubber. As the upper surface of the transport belt 1 is electrified, it electrostatically attracts the transport material 6.

In the transport device of such construction, the transport material 6 sent onto the transport surface of the transport belt 1 by the registration rollers 5a and 5b, is electrostatically adhered to the transport surface of the transport belt 1 electrified by the electrifying device 15 for attraction.

When sent onto the transport belt 1, the transport material 6 is pushed by the attraction auxiliary roller 3 to the transport surface of the transport belt 1, thus being forced to closely come into contact with the transport surface.

On the transport material 6 which is electrostatically adhered on the transport belt 1, an image is formed by a plurality of nozzles of the ink jet head 2. Then, the transport material 6 is peeled off from the upper surface of the transport belt 1 owing to the rigidity of the transport material 6, being delivered to the left in FIG. 1, from which it is transported to the next step.

In the present embodiment, rotation of the body of the motor 11 is prevented by fitting the rotation preventing plate 13 mounted on the motor 11 body onto the platen 12 backing up the belt 1. This may otherwise be done by using a stationary portion other than the platen. For example, a pin or the like is mounted on the machine body and the rotation preventing plate 13 is fitted on this pin.

Figure 3:
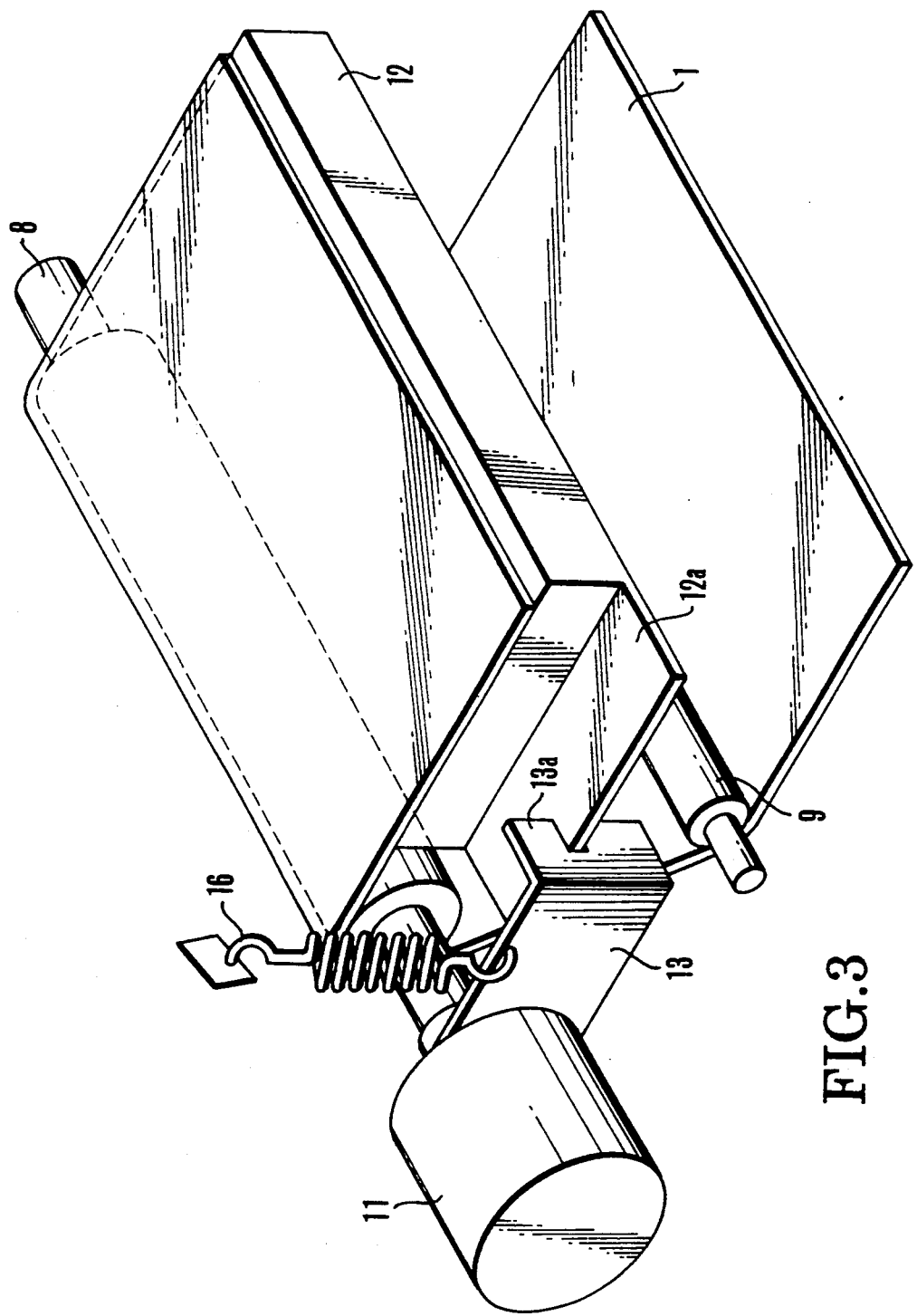
FIG. 3 is a perspective view illustrating an example of variation of the device of FIG. 2.

Also, to prevent vibrations (backlash) in the engaging portion between the rotation preventing plate 13 and the stationary portion, instead of the rubber or the like used in the present embodiment, it is also possible to use, for example, a spring 16 or the like as shown in FIG. 3.

Further, in the above-described embodiment, the cutout is provided in the bent end portion 13a of the rotation preventing plate 13 of the motor 11 body and is fitted on the extension 12a of the platen 12. This may be reversed so that a cutout is provided in the extension 12a of the platen 12 and is fitted on the bent end portion 13a of the rotation preventing plate 13. At this time, there is need to consider the shapes of the extension 12a and the bent end portion 13a so as not to hinder waggling of the motor body due to the eccentricity of the output shaft of the motor 11.

As has been described in detail above, according to the invention, in the support device for a motor in which the method of connecting the output shaft of the motor directly to the driven shaft is employed, the motor body is supported by the direct connection of the aforesaid motor output shaft to the aforesaid driven shaft, and the rotation preventing plate is provided to the aforesaid motor body, wherein by engaging the rotation preventing plate of the motor body with a fixed thing, rotation of the motor body is prevented. Therefore, the eccentricity of the output shaft of the motor and the eccentricity due to the connection of the output shaft with the driven shaft are absorbed by waggling of the motor body, thereby making it possible to prevent deterioration of the accuracy of rotation due to the eccentricity, and also to prevent the bad influence from arising from the application of a stress to the motor and the motor-mounted portion.

What is claimed is:

1. A drive motor and motor supporting device, comprising:
    a driven device having a driven shaft, said driven device having a first fixed member;
    a motor provided with a motor output shaft connected directly to said driven shaft of said driven device, said motor having a motor case and being cantileverly supported only by connection to said driven shaft;
    a rotation preventing member fixedly secured to said motor case;
    stabilizing means for fitting said rotation preventing member to said first fixed member, said stabilizing means including a cut-out portion in either said rotation preventing member or said first fixed member and a complementary portion on the other of said rotation preventing member or said first fixed member for extending into the cut-out portion in said rotary preventing member or said fixed member, said stabilizing means preventing the rotation of said motor and preventing eccentric deviation of said motor output shaft; and
    an elastic member for elastically engaging said rotation preventing member with said fixed member.

2. A device according to claim 1, wherein said elastic member is a spring member, said spring member being provided between said rotation preventing member and a second fixed portion.

3. A device according to claim 1, wherein said rotation preventing member has an angled portion in which the cut-out portion is defined.

4. A device according to claim 3, wherein said elastic member is provided in the cut-out portion, and said first fixed member includes a planar portion which is inserted into the cut-out portion.

5. A device according to claim 4, wherein said elastic member is formed of rubber.

6. A drive motor and motor supporting device, comprising:
    a driven device having a driven shaft, said driven device having a fixed member;
    a motor provided with a motor output shaft connected directly to said driven shaft of said driven device, said motor having a motor case and being cantileverly supported by connection to said driven shaft;
    a rotation preventing member fixedly secured to said motor case; and
    stabilizing means for connecting said rotation preventing member to said fixed member, said stabilizing means including a cut-out portion in either said rotation preventing member or said fixed member, and a complementary portion on the other of said rotation preventing member or said fixed member for extending into the cut-out portion in said rotary preventing member or said first fixed member, said stabilizing means preventing the rotation of said motor and preventing eccentric deviation of said motor output shaft.

7. A device according to claim 6, wherein said complementary portion and the cut-out portion each have a thickness, and wherein the thickness of said complementary portion is substantially equal to the thickness of the cut-out portion.

* * * * *